United States Patent
Ozawa et al.

(10) Patent No.: US 7,914,925 B2
(45) Date of Patent: Mar. 29, 2011

(54) THIN-TYPE SECONDARY BATTERY AND METHOD OF PRODUCING THE SAME, AND SECONDARY BATTERY MODULE

(75) Inventors: Kazunori Ozawa, Tokyo (JP); Kazuhiro Takahashi, Tokyo (JP); Yuuji Tanjou, Kanagawa (JP); Takeshi Miyamoto, Kanagawa (JP)

(73) Assignees: Enax, Inc., Tokyo (JP); Nissan Motor Co., Ltd., Yokohama-Shi (JP)

( * ) Notice: Subject to any disclaimer, the term of this patent is extended or adjusted under 35 U.S.C. 154(b) by 1308 days.

(21) Appl. No.: 11/038,141

(22) Filed: Jan. 21, 2005

(65) Prior Publication Data
US 2005/0170243 A1   Aug. 4, 2005

(30) Foreign Application Priority Data
Feb. 4, 2004   (JP) .................. 2004-028564

(51) Int. Cl.
*H01M 10/04* (2006.01)
*H01M 2/02* (2006.01)
*H01M 2/06* (2006.01)

(52) U.S. Cl. ......... 429/162; 429/66; 429/181; 29/623.2; 29/623.5

(58) Field of Classification Search .......... 429/162, 429/181, 180
See application file for complete search history.

(56) References Cited

U.S. PATENT DOCUMENTS

| | | | |
|---|---|---|---|
| 5,871,861 A | 2/1999 | Hirokou et al. | |
| 6,458,483 B1 | 10/2002 | Hamano et al. | |
| 6,461,757 B1 | 10/2002 | Sasayama et al. | |
| 6,686,092 B2 | 2/2004 | Yageta et al. | |
| 2003/0064286 A1* | 4/2003 | Yoshida et al. | 429/184 |
| 2004/0002000 A1* | 1/2004 | Oogami et al. | 429/162 |

FOREIGN PATENT DOCUMENTS

| | | |
|---|---|---|
| JP | 7-282841 A | 10/1995 |
| JP | 2000-123858 A | 4/2000 |
| JP | 2000-133220 A | 5/2000 |

(Continued)

OTHER PUBLICATIONS

Search Report mailed Jun. 14, 2010 for European Application No. 05000814.3.

*Primary Examiner* — Patrick Ryan
*Assistant Examiner* — Ashley Kwon
(74) *Attorney, Agent, or Firm* — Birch, Stewart, Kolasch & Birch, LLP

(57) ABSTRACT

To provide a high capacity thin-type secondary battery suitably formed into a module and having no thickness fluctuation, excellent quality stability, and excellent heat radiation properties, by using a sheet-like separator having expansion anisotropy due to penetration of an electrolytic solution. A method of producing a thin-type secondary battery includes the steps of: sandwiching a sheet-like separator having expansion anisotropy due to penetration of an electrolytic solution, by a sheet-like electrode pair; inserting the separator sandwiched by the electrode pair and injecting the electrolytic solution, into a thin-type outer wrapper having an opened portion; penetrating the electrolytic solution into the separator without fixing motion of the separator in a maximum expanding direction and in a state where the maximum expanding direction of the separator and a penetrating direction of the electrolytic solution are substantially parallel to each other; and sealing the opened portion into a tightly sealed state.

17 Claims, 7 Drawing Sheets

FOREIGN PATENT DOCUMENTS

| | | |
|---|---|---|
| JP | 2000-133244 A | 5/2000 |
| JP | 2001-176546 A | 6/2001 |
| JP | 2002-151052 A | 5/2002 |
| JP | 2002-298833 A | 10/2002 |
| JP | 2003-45495 A | 2/2003 |
| JP | 2003-082139 A | 3/2003 |
| JP | 2003-103624 A | 4/2003 |
| WO | WO 98/42036 A1 | 9/1998 |

\* cited by examiner

THIN-TYPE SECONDARY BATTERY AND METHOD OF PRODUCING THE SAME, AND SECONDARY BATTERY MODULE

FIELD OF THE INVENTION AND RELATED ART STATEMENT

The present invention relates to a secondary battery preferably used for high capacity applications such as electric automobiles, UPS (uninterruptible power supply), and load leveling of electricity, and to a method of producing the same.

Electric automobiles have attracted attention in recent years for reasons of environmental problems and the like. Further, there is an increasing demand for a high capacity, low cost, maintenance-free, thin-type secondary battery having excellent heat radiation properties for the purposes of securing electricity at times of disasters such as earthquakes, of efficiently using night electricity, and the like.

A lithium ion secondary battery is excellent in providing high energy density, and there has been proposed a high capacity secondary battery module which has a plurality of lithium ion secondary batteries (unit batteries) connected in series with each other to form a battery pack which is incorporated into a casing to form a module (JP 07-282841 A, for example). However, the high capacity secondary battery module has problems in that: a container main body of the module inevitably has a relatively large block-shaped contour because the container main body must contain a plurality of unit batteries of block shape, which greatly limits the degree of freedom in designing the shape of the container main body; and the container main body inevitably becomes large because the container main body must have partition walls for insulating unit batteries forming a battery pack, which thus increases the weight of the container main body.

In a field strongly desiring miniaturization and weight saving of electronic devices or the like, there has been proposed a wound secondary battery formed by spirally winding under tension a plate group, in which a positive plate and a negative plate are insulated from each other through a separator (JP 2003-045495 A, for example) However, formation of a high capacity battery pack using the wound secondary batteries has a problem in heat radiation.

Regarding a relatively small capacity secondary battery, in particular, a lithium ion secondary battery, there has been proposed a lightweight thin-type lithium ion secondary battery obtained by forming a bag-like outer wrapper using a laminate film as a battery case and sealing a sheet-shaped internal electrode pair and an electrolytic solution in the bag-like outer wrapper (republished WO 98/42036, JP 2000-133220 A, and JP 2001-176546 A, for example).

There has been proposed a porous polyolefin sheet subjected to stretch processing as a separator used for the above-mentioned secondary batteries (JP 2003-082139 A and JP 2003-103624 A, for example).

SUMMARY OF THE INVENTION

For example, in applications of a secondary battery used for electric automobiles or the like, a very large-size secondary battery requires drastic changes in arrangements of other components for installing the secondary battery and considerably limits an installation space for the secondary battery module. Further, an increased weight of the secondary battery module thus deteriorates fuel efficiency of the automobiles. Therefore, a secondary battery which is as small-size and lightweight as possible and has a high degree of freedom in designing the shape thereof has been demanded.

A separator subjected to stretch processing is applied to a sheet-shaped lithium ion secondary battery (unit battery) for forming a battery pack, to thereby form an expected secondary battery which is space-saving, excellent in heat radiation properties, lightweight, and of high capacity, used in a field of electric automobiles and the like, for example.

However, in production of a secondary battery using the sheet-shaped separator subjected to stretch processing, wrinkles are formed on the sheet-shaped separator subjected to stretch processing. The wrinkles are formed due to effects of expansion anisotropy during thermal shrinkage of the separator through high temperature drying for water removal or during expansion thereof through penetration of an electrolytic solution to wet the separator. Thus, a distance between electrodes increases, causing deterioration in charge-discharge behavior, and the fluctuations in thickness and poor appearance of the sheet-shaped secondary battery.

It is an object of the present invention therefore to provide a high capacity thin-type secondary battery suitably formed into a module and having no thickness fluctuation, excellent quality stability, and excellent heat radiation properties, by using a sheet-shaped separator having expansion anisotropy due to penetration of an electrolytic solution.

The inventors of the present invention have found that wrinkles on a separator greatly affect thickness fluctuation or quality stability of a thin-type secondary battery, and have intensively studied a wrinkle formation mechanism of a sheet-shaped separator subjected to stretch processing. The wrinkles are formed by relaxation shrinkage through heat treatment or the like of the sheet-shaped separator subjected to stretch processing and by subsequent penetration of an electrolytic solution to be swelled. In particular, a separator expands greatly in a maximum stretching direction. As a result, the separator is curved, and tunnel-like linear wrinkles are formed perpendicular to the stretching direction of the separator (FIG. 6).

The wrinkles formed on the separator grow due to formation of tunnel-like air layers from a side of an edge where an electrolytic solution starts to penetrate as an origin in the same direction (parallel to) as a penetrating direction of the electrolytic solution. The layers of air are independent in layers of the separator having the electrolytic solution penetrated, and wrinkles are formed as remained layers of air (FIG. 6). This phenomenon is particularly significant when the penetrating direction of the electrolytic solution and a maximum stretching direction of the separator are perpendicular to each other, or when the separator has electrolytic solution penetration rate anisotropy and a direction of a maximum electrolytic solution penetration rate of the separator and the penetrating direction of the electrolytic solution are substantially parallel to each other. Wrinkles once formed as layers of air cannot be easily removed even through vacuum defoaming treatment or a vacuum sealing step. Meanwhile, wrinkles are hardly formed when an angle between the penetrating direction of the electrolytic solution and the maximum stretching direction of the separator is 0 to 30°, or when an angle between the direction of the maximum electrolytic solution penetration rate of the separator and the penetrating direction of the electrolytic solution is 60 to 90° (FIG. 7).

Wrinkle formation can be physically suppressed through a method of injecting an electrolytic solution while applying a contact pressure on a sheath of the sheet-shaped secondary battery, even if the maximum stretching direction of the separator is perpendicular to the penetrating direction of the electrolytic solution. However, when a contact pressure is applied to the sheath, an amount of the electrolytic solution is hardly controlled because the electrolytic solution hardly penetrates into a three-way sealed body, the penetration takes time, the electrolytic solution bursts out in four-way sealing, and the like. The penetration of the electrolytic solution can be accelerated by maintaining the three-way sealed body in vacuum or under reduced pressure for a certain time period and degassing air therefrom. However, elimination of the contact pressure results in formation of wrinkles, and thus, a pressure must be reduced while a contact pressure is applied. As a result, defoaming requires a long period of time, thereby causing a problem such that a solvent vaporizes to change a composition of the electrolytic solution.

The inventors of the present invention have devised a separator so that the electrolytic solution penetrates into the separator without fixing motion of the separator in a maximum expanding direction and in a state where the maximum expanding direction of the separator and the penetrating direction of the electrolytic solution are substantially parallel to each other, to thereby form a separator without wrinkle formation. The inventors of the present invention have applied the separator to a high capacity thin-type secondary battery having excellent heat radiation properties, to thereby complete the present invention.

That is, an aspect of the present invention relates to a method of producing a thin-type secondary battery including the steps of: sandwiching a sheet-shaped separator having expansion anisotropy due to penetration of an electrolytic solution, by a sheet-shaped electrode pair; inserting the separator sandwiched by the electrode pair and injecting the electrolytic solution, into a thin-type outer wrapper having an opened portion; penetrating the electrolytic solution into the separator without fixing motion of the separator in a maximum expanding direction and in a state where the maximum expanding direction of the separator and a penetrating direction of the electrolytic solution are substantially parallel to each other; and sealing the opened portion into a tightly sealed state.

Another aspect of the present invention relates to a method of producing a thin-type secondary battery, in which the electrolytic solution is penetrated into the separator by aging the separator for 10 to 60 minutes in a state where the maximum expanding direction of the separator is substantially vertical, after insertion of the separator and injection of the electrolytic solution.

Still another aspect of the present invention relates to a method of producing a thin-type secondary battery, in which the electrolytic solution is penetrated into the separator by inserting the separator sandwiched by the electrode pair into the thin-type outer wrapper and injecting the electrolytic solution into the thin-type outer wrapper without fixing motion of the separator in the maximum expanding direction and in a state where the maximum expanding direction of the separator and the penetrating direction of the electrolytic solution are substantially parallel to each other.

Yet another aspect of the present invention relates to a method of producing a thin-type secondary battery, in which the electrolytic solution is penetrated into the separator by injecting the electrolytic solution into the thin-type outer wrapper and inserting the separator sandwiched by the electrode pair into the thin-type outer wrapper having the electrolytic solution injected without fixing motion of the separator in the maximum expanding direction and in a state where the maximum expanding direction of the separator and the penetrating direction of the electrolytic solution are substantially parallel to each other.

Still yet another aspect of the present invention relates to a method of producing a thin-type secondary battery, in which an angle between the maximum expanding direction of the separator and the penetrating direction of the electrolytic solution is 0 to 30° during penetration of the electrolytic solution.

An aspect of the present invention relates to a method of producing a thin-type secondary battery, in which: the separator is formed of a porous stretched sheet; and a maximum stretching direction of the separator is referred to as the maximum expanding direction.

Another aspect of the present invention relates to a method of producing a thin-type secondary battery, in which: the separator has electrolytic solution penetration rate anisotropy; and the electrolytic solution is penetrated into the separator in a state where a direction of a maximum electrolytic solution penetration rate of the separator and the penetrating direction of the electrolytic solution are substantially perpendicular to each other.

Still another aspect of the present invention relates to a method of producing a thin-type secondary battery, in which an angle between the direction of the maximum electrolytic solution penetration rate of the separator and the penetrating direction of the electrolytic solution is 60 to 90° during penetration of the electrolytic solution.

Yet another aspect of the present invention relates to a method of producing a thin-type secondary battery, in which a plurality of the separators each sandwiched by the electrode pair are laminated and inserted into the thin-type outer wrapper.

Still yet another aspect of the present invention relates to a method of producing a thin-type secondary battery, in which the thin-type outer wrapper is a flexible sheet-shaped outer wrapper.

An aspect of the present invention relates to a method of producing a thin-type secondary battery, in which the sheet-shaped outer wrapper has a substantially rectangular shape.

Another aspect of the present invention relates to a method of producing a thin-type secondary battery, in which: the sheet-shaped outer wrapper has a bag-like shape with one unsealed side; the electrolytic solution is injected to penetrate into the separator; and the unsealed side is sealed into a tightly sealed state.

Still another aspect of the present invention relates to a method of producing a thin-type secondary battery, in which: the separator sandwiched by the electrode pair is sandwiched by a substantially rectangular sheet-shaped outer wrapper pair formed of a laminate film; an edge portion of the sheet-shaped outer wrapper pair is sealed with one side remained unsealed; the electrolytic solution is injected to penetrate into the separator; and the unsealed side is sealed into a tightly sealed state.

Yet another aspect of the present invention relates to a method of producing a thin-type secondary battery, in which: the electrode pair is connected to a positive electrode terminal and a negative electrode terminal; and the separator sandwiched by the electrode pair is sandwiched by the sheet-shaped outer wrapper pair with both the terminals pulled out.

Still yet another aspect of the present invention relates to a method of producing a thin-type secondary battery, in which both the terminals are sandwiched by the sheet-shaped outer wrapper pair with both the terminals pulled out from one side of the sheet-shaped outer wrapper pair.

An aspect of the present invention relates to a method of producing a thin-type secondary battery, in which the one side of the sheet-shaped outer wrapper pair and the maximum expanding direction of the separator are substantially parallel to each other.

Another aspect of the present invention relates to a method of producing a thin-type secondary battery, in which the one side of the sheet-shaped outer wrapper pair and the maximum expanding direction of the separator are substantially perpendicular to each other.

Still another aspect of the present invention relates to a method of producing a thin-type secondary battery, in which both the terminals are sandwiched by the sheet-shaped outer wrapper pair with both the terminals pulled out from two corresponding sides of the sheet-shaped outer wrapper pair.

Yet another aspect of the present invention relates to a method of producing a thin-type secondary battery, in which the two sides of the sheet-shaped outer wrapper pair and the maximum expanding direction of the separator are substantially parallel to each other.

Further, an aspect of the present invention relates to a thin-type secondary battery, including: a sheet-shaped separator having expansion anisotropy due to penetration of an electrolytic solution and having the electrolytic solution penetrated; a sheet-shaped electrode pair sandwiching the separator; and a thin-type outer wrapper containing the separator and the electrode pair in a tightly sealed state, in which: the separator is sandwiched between the electrode pair without fixing motion of the separator in a maximum expanding direction; and the maximum expanding direction of the separator and a penetrating direction of the electrolytic solution are substantially parallel to each other during penetration of the electrolytic solution in a production process.

Another aspect of the present invention relates to a thin-type secondary battery, in which a plurality of the separators each sandwiched by the electrode pair are laminated and contained in the thin-type outer wrapper in a tightly sealed state.

Still another aspect of the present invention relates to a thin-type secondary battery, in which the thin-type outer wrapper is a flexible sheet-shaped outer wrapper.

Yet another aspect of the present invention relates to a thin-type secondary battery, in which the sheet-shaped outer wrapper has a substantially rectangular shape and is provided with a positive electrode terminal and a negative electrode terminal connected to the electrode pair and pulled out from the sheet-shaped outer wrapper.

Still yet another aspect of the present invention relates to a thin-type secondary battery, in which: both the terminals are pulled out from one side of the sheet-shaped outer wrapper; and the maximum expanding direction of the separator and the one side of the sheet-shaped outer wrapper are substantially parallel to each other.

An aspect of the present invention relates to a thin-type secondary battery, in which: both the terminals are pulled out from one side of the sheet-shaped outer wrapper; and the maximum expanding direction of the separator and the one side of the sheet-shaped outer wrapper are substantially perpendicular to each other.

Another aspect of the present invention relates to a thin-type secondary battery, in which: both the terminals are pulled out from two corresponding sides of the sheet-shaped outer wrapper; and the maximum expanding direction of the separator and the two sides of the sheet-shaped outer wrapper are substantially parallel to each other.

Still another aspect of the present invention relates to a thin-type secondary battery, in which both the terminals each have a shape folded back on a line parallel to the side of the sheet-shaped outer wrapper.

Further, an aspect of the present invention relates to a secondary battery module, including: a battery pack formed by connecting the thin-type secondary batteries in series and/or parallel with each other; and a casing containing the battery pack.

In the specification of the present invention, a maximum expanding direction of a separator refers to a direction of maximum expansion of a sheet-shaped separator having expansion anisotropy due to penetration of an electrolytic solution. The sheet-shaped separator usually has reduced surface energy and expands due to penetration of an electrolytic solution. For example, the sheet-shaped separator having expansion anisotropy due to penetration of an electrolytic solution has wrinkles easily formed thereon in a direction perpendicular to the maximum expanding direction. For example, a stretched sheet-shaped separator is subjected to relaxation shrinkage through heat treatment and then expands due to penetration of the electrolytic solution. Wrinkles are easily formed in a direction perpendicular to the maximum expanding direction of the separator (FIG. 6).

In the method of producing a thin-type secondary battery of the present invention, however, the maximum expanding direction of the separator and the penetrating direction of the electrolytic solution are maintained substantially parallel to each other during penetration of the electrolytic solution into the separator. Thus, the electrolytic solution penetrates from an edge of the separator so as to be attached to electrodes, and wrinkles are hardly formed on the separator although motion of the separator is not fixed (FIG. 7).

That is, formation of wrinkles on the stretched sheet-shaped separator is most effectively prevented by designing a process of producing the sheet-shaped secondary battery to maintain the maximum expanding direction of the separator substantially parallel to the penetrating direction of the electrolytic solution. The penetrating direction of the electrolytic solution is determined by an injection method and an injecting direction of an electrolytic solution. The simplest example of battery design and injection method is a method involving: sealing three sides with one side having neither positive electrode terminal nor negative electrode terminal pulled out, remained unsealed; and opening the unsealed side to inject an electrolytic solution. In this case, the electrolytic solution is injected from an opened side of a thin-type outer wrapper (opened side). Thus, an opened direction of the thin-type outer wrapper and the maximum stretching direction of the separator are adjusted to be substantially parallel to each other (that is, the opened side and the maximum stretching direction of the separator are adjusted to be substantially perpendicular to each other), to thereby bring about a state in which the maximum expanding direction of the separator and the penetrating direction of the electrolytic solution are substantially parallel to each other.

In this case, an opened portion can be narrowed by sealing part of the opened side. Further, the production method of the present invention can be realized in production of a sheet-shaped battery in which a stretching direction of the separator is directed toward a sealed side of the four sides of a rectangular thin-type outer wrapper through a technique of injecting an electrolytic solution by inserting an injector or the like, for example. Further, the battery can be designed so that the maximum expanding direction of the separator and the penetrating direction of the electrolytic solution are substantially parallel to each other.

An injecting position of the electrolytic solution is not particularly limited to a position such as the center or an edge of an opened side of a thin-type secondary battery, designed to seal the opened side of the thin-type outer wrapper of a three-way sealed body at last. Regarding penetration of the electrolytic solution after injection, if the electrolytic solution is injected with the opened portion facing upward, the electrolytic solution penetrates downward. By taking this fact in consideration, the maximum expanding direction of the separator and the penetrating direction of the electrolytic solution may be substantially parallel to each other. Meanwhile, if the stretching direction of the separator is directed toward an opened direction and the electrolytic solution is injected to a bottom side of the thin-type outer wrapper at once so that the electrolytic solution does not touch a laminate consisting of a sheet-shaped separator and a sheet-shaped electrode pair, the maximum expanding direction of the separator and the penetrating direction of the electrolytic solution can be substantially parallel to each other by penetrating the electrolytic solution from the bottom side of the thin-type outer wrapper upward to the opened portion through the principle of capillary phenomenon.

The results of the experiments conducted by the inventors of the present invention regarding the injection method of the electrolytic solution revealed that when the electrolytic solution is injected into the three-way sealed body with the opened portion facing upward, the electrolytic solution is injected to a bottom side of the three-way sealed body at once while the electrolytic solution is prevented from touching the laminate, and is then penetrated upward to the opened portion from the bottom side. Thus, air remained in the laminate is easily discharged toward the opened portion, and wrinkles are hardly formed.

In the method of producing the thin-type secondary battery of the present invention, the motion of the separator in a maximum expanding direction is not fixed during penetration of the electrolytic solution into the separator. Thus, no jig for fixing the separator is required in an inner structure of the thin-type secondary battery. Further, a production facility investment cost can be reduced and a small-size and lightweight thin-type secondary battery having a high degree of freedom in designing the shape thereof can be provided.

In the method of producing the thin-type secondary battery of the present invention, a laminate consisting of a sheet-shaped separator having expansion anisotropy and a sheet-shaped electrode pair is formed by sandwiching the sheet-shaped separator, by the sheet-shaped electrode pair. The laminate may be inserted into a thin-type outer wrapper having an opened portion, and then an electrolytic solution can be injected thereinto. In this case, the electrolytic solution is penetrated into the separator by: inserting the separator sandwiched by the electrode pair into the thin-type outer wrapper; and injecting the electrolytic solution into the thin-type outer wrapper without fixing motion of the separator in a maximum expanding direction and in a state where the maximum expanding direction of the separator and a penetrating direction of the electrolytic solution are substantially parallel to each other.

The laminate is inserted into the thin-type outer wrapper having an opened portion, and the resultant is preferably dried in vacuum. The electrolytic solution is then injected thereinto.

In a reverse order, the electrolytic solution may be injected into the thin-type outer wrapper, and then the laminate may be injected into the thin-type outer wrapper. In this case, the electrolytic solution is penetrated into the separator by: injecting the electrolytic solution into the thin-type outer wrapper; and inserting the separator sandwiched by the electrode pair into the thin-type outer wrapper having the electrolytic solution injected without fixing motion of the separator in a maximum expanding direction and in a state where the maximum expanding direction of the separator and a penetrating direction of the electrolytic solution are substantially parallel to each other.

Regarding the injection method of the electrolytic solution, the electrolytic solution is preferably accumulated at the bottom of a three-way sealed thin-type outer wrapper so that the electrolytic solution penetrates upward through the laminate from the bottom. This is because when the electrolytic solution is poured from the top of the laminate, bubbles are liable to remain in the laminate and penetration is not uniform in some cases.

The step of penetrating the electrolytic solution into the separator is carried out without fixing motion of the separator in a maximum expanding direction and in a state where the maximum expanding direction of the separator and the penetrating direction of the electrolytic solution are substantially parallel to each other. When this step (aging) is not carried out or when the step is not sufficient, the electrolytic solution bursts out. On the other hand, too long an aging time leads to an opened battery. Thus, a solvent component of the electrolytic solution vaporizes, causing a change in a composition of the electrolytic solution. The aging time is preferably 10 to 60 minutes, more preferably 15 to 50 minutes, particularly preferably 20 to 40 minutes, before the opened portion is sealed into a tightly sealed state.

The progress of penetration of the electrolytic solution in a three-way sealed body without a contact pressure applied may accelerate localized penetration thereof in the laminate. Thus, entire and sufficient penetration of the electrolytic solution between electrodes and into the separator is preferably carried out after four-way sealing.

In the thin-type secondary battery of the present invention, a sheet-shaped separator and a sheet-shaped electrode pair preferably form a laminate. The laminate can be formed by laminating a sheet-shaped internal electrode pair through a separator. The sheet-shaped internal electrode pair includes: a sheet-shaped positive electrode consisting of a sheet-shaped positive electrode current collector and a positive electrode active material applied on a surface thereof; and a sheet-shaped negative electrode consisting of a sheet-shaped negative electrode current collector and a negative electrode active material applied on a surface thereof.

The thin-type outer wrapper containing the sheet-shaped internal electrode pair and the electrolytic solution in a tightly sealed state is preferably a flexible bag-like outer wrapper. The flexible bag-like outer wrapper preferably has a strength allowing use as a unit battery case for the sheet-shaped secondary battery and excellent resistance to an electrolytic solution to be contained. A specific example thereof is a flexible bag-like outer wrapper formed using a laminate film of a three layer structure having: an inner surface layer made of a thermoplastic resin having excellent resistance to an electrolytic solution and thermocompression bonding properties such as polyethylene, polypropylene, polyethylene terephthalate (PET), polyamide, or ionomer on an inner surface side; a middle layer made of a metal foil having excellent flexibility and strength such as an aluminum foil or a SUS foil in a middle; and an outer surface layer made of an electrically insulated resin having excellent electrical insulation such as a polyamide resin or a polyester resin on an outer surface side.

The thin-type secondary batteries of the present invention may be connected in series and/or parallel to form a battery pack and the battery pack may be contained in a casing, to thereby form a secondary battery module. In forming a battery pack by efficiently connecting a plurality of secondary batteries in series and/or parallel, a positive electrode terminal and a negative electrode are preferably formed as sheets. The positive electrode terminal and the negative electrode terminal of each of the secondary batteries may be provided at any position of the thin-type outer wrapper, but in order to form a battery pack by efficiently connecting a plurality of secondary batteries in series, the positive electrode terminal and the negative electrode terminal are preferably provided on the thin-type outer wrapper so as to extend toward opposite directions from each other. In addition, the secondary batteries forming the battery pack are more preferably formed in substantially the same shape and size.

The positive electrode terminal and the negative electrode terminal of the thin-type secondary battery of the present invention are formed as sheets, and are usually made of relatively thin aluminum sheets, copper sheets, nickel sheets, or the like each having a thickness of about 50 to 200 μm.

In the secondary battery module of the present invention, a battery laminated pair is formed by vertically laminating the batteries and/or a battery adjacent pair is formed by horizontally positioning the batteries, so that thermal environments of the thin-type secondary batteries are substantially the same with each other. Thus, a thermal balance in the battery laminated pair as a whole can be maintained although the temperature rises (heat generation) on the side of insertion (dope) and the temperature drops (heat absorption) on the side of separation (de-dope) during charge and discharge of the secondary batteries. Further, formation of areas having partly high temperatures are avoided during charge and discharge of the battery pack contained in the casing. Thus, all the secondary batteries forming a battery pack can be maintained at low temperatures and heat radiation of the battery pack can be more efficiently carried out by heat radiation means such as filling of a resin.

In the secondary battery module of the present invention, a battery pack may be formed by: laminating one or more than two thin-type secondary batteries so that the terminals of the same electrode face each other; forming a battery unit by connecting these terminals in parallel with each other; and using the battery unit as a base. As described above, efficient heat radiation can be maintained by forming a battery unit in which a plurality of thin-type secondary batteries are connected in parallel with each other and forming a battery pack using the battery unit, to thereby allow assembly of a secondary battery module of higher capacity.

The battery pack formed as described above usually has a cuboid-shaped contour with a thin wall (thin-walled cuboid) and the battery pack of this thin-walled cuboid shape is used as a base. For example, when a lithium ion secondary battery module of higher capacity is required, a plurality of battery packs may be positioned horizontally and connected in series with each other, or a plurality of battery packs may be treated as a unit (battery pack unit), where the battery pack units are laminated vertically and/or positioned horizontally so that the thermal environments of all battery pack units are the same, to thereby form a larger-size battery pack. In order to secure thin-type and uniform heat radiation of the secondary battery module, the battery pack preferably satisfies the expression A/t=400 cm, where A denotes the largest surface (normally plane surface) area (cm$^2$) and t denotes the thickness (cm).

In the secondary battery module of the present invention, the number of the thin-type secondary batteries used to form a battery pack or the number of battery laminated pairs to be formed is not particularly limited, and is arbitrarily selected depending on the conditions for designing the secondary battery module such as: a capacity (Ah), energy (Wh), power (W), or the like of the thin-type secondary battery to be used; a required capacity, allowable size and weight, or the like of the secondary battery module to be produced; and a position of an external terminal on the casing for drawing electricity out of the secondary battery module to be produced through the casing to the outside. Thus, when the number of thin-type secondary batteries to be used is an odd number, one of the thin-type secondary batteries is used without forming a battery laminated pair.

In the thin-type secondary batteries adjacently positioned horizontally to form a battery adjacent pair, pressure bonded portions of the thin-type outer wrapper are preferably overlapped on each other, to thereby preferably form a more compact battery pack.

DETAILED DESCRIPTION OF THE PREFERRED EMBODIMENT

Figure 1:
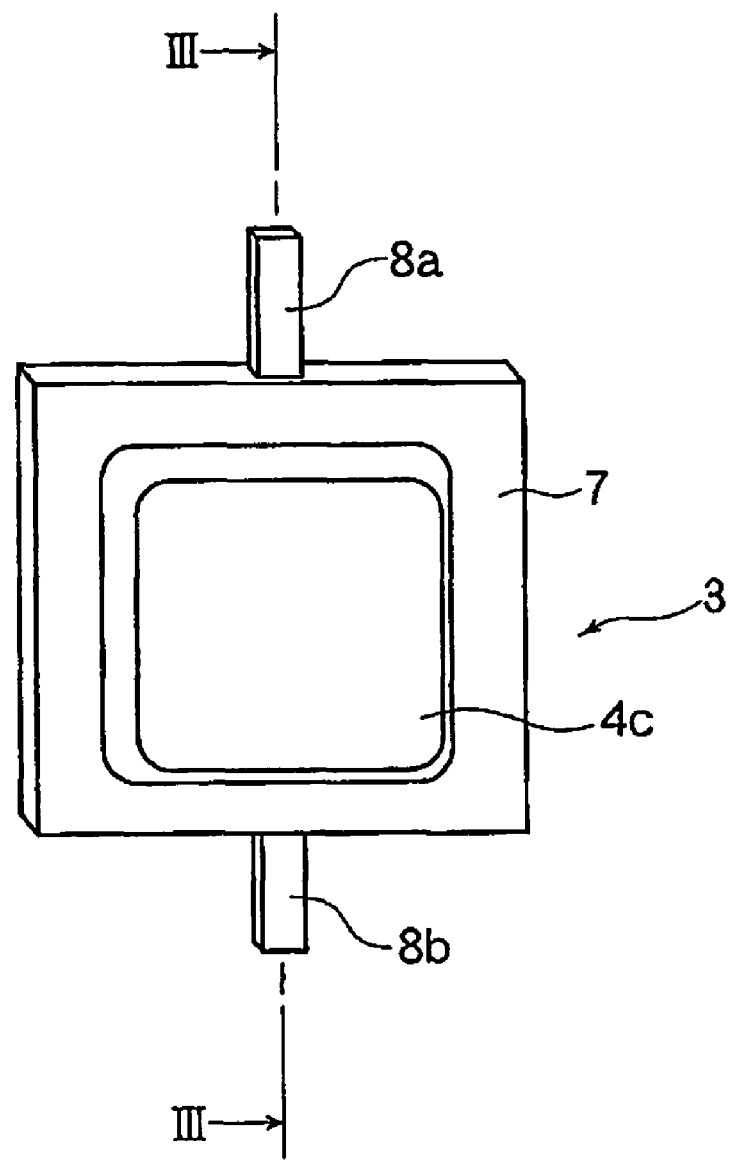
FIG. 1 is a perspective view of a secondary battery according to Embodiment 1 of the present invention.

Hereinafter, embodiments of the present invention will be described based on the drawings.

Embodiment 1

(Preparation of Sheet-shaped Positive Electrode)

Commercially available lithium manganate $LiMn_2O_4$ (positive electrode active material, average particle size of 10 μm), acetylene black (conductor), and polyvinylidene fluoride (binder) were mixed in a mass ratio of 89:6:5 using N-methyl pyrrolidone. The mixture was applied onto each surface of an aluminum sheet (positive electrode current collector) having a thickness of 15 μm, at a thickness of about 130 μm and the resultant was dried, to thereby prepare a sheet-shaped positive electrode. The positive electrode was cut out into a size of 14.3 cm×12.9 cm.

(Preparation of Sheet-Like Negative Electrode)

Commercially available graphite powder (negative electrode active material, average particle size of 12 μm) and polyvinylidene fluoride (binder) were mixed in a mass ratio of 93:7 using N-methyl pyrrolidone. The mixture was applied onto each surface of a copper sheet (negative electrode current collector) having a thickness of 14 μm, at a thickness of about 80 μm and the resultant was dried, to thereby prepare a sheet-shaped negative electrode. The negative electrode was cut out into a size of 14.8 cm×13.0 cm.

(Preparation of Nonaqueous Electrolytic Solution)

Into a solvent prepared by mixing ethylene carbonate (EC) and dimethyl carbonate (DMC) in a mass ratio of 50:50, $LiPF_6$ was dissolved in a concentration of 1 mol/L, to thereby prepare an organic electrolytic solution.

(Separator)

A commercially available porous stretched polypropylene sheet (UP3025, available from Ube Industries, Ltd.) was used as a separator. The separator was cut out into a size of 14.8 cm×12.8 cm. The separator has expansion anisotropy due to penetration of the nonaqueous electrolytic solution. A maximum expanding direction of the separator and a maximum stretching direction of the sheet are substantially parallel to each other, and the directions are also substantially parallel to sides of 14.8 cm.

(Laminate)

The separators (4 sheets), the sheet-shaped positive electrodes (2 sheets), and the sheet-shaped negative electrodes (3 sheets) were alternately laminated so that both the outermost layers were the negative electrodes and that the separators were sandwiched by both the positive and negative electrodes, to thereby prepare a laminate consisting of the sheet-shaped separators and sheet-shaped electrode pairs. Positive electrode terminals were laminated to overlap on each other at a corresponding side, and negative electrode terminals were laminated to overlap on each other at a corresponding side.

(Bonding of Positive Electrode Terminal)

A positive electrode terminal of an aluminum foil of width 3 cm×length 4 cm×thickness 0.15 mm was bonded to the positive electrode through ultrasonic welding in a form pulled out from the side of 14.3 cm of the positive electrode so that the center of the positive electrode terminal was provided at a position of 7.15 cm from edges of the side of the positive electrode.

(Bonding of Negative Electrode Terminal)

A negative electrode terminal of a nickel foil of width 3 cm×length 4 cm×thickness 0.15 mm was bonded to the negative electrode through ultrasonic welding in a form pulled out from the side of 14.8 cm of the negative electrode so that the center of the negative electrode terminal was provided at a position of 7.4 cm from edges of the side of the negative electrode.

(Outer Wrapper Pair)

A flexible laminate film of a three layer structure having an inner surface layer made of polyethylene on an inner surface side, a middle layer made of an aluminum foil in a middle, and an outer surface layer made of a polyamide resin on an outer surface side was prepared. Two films each obtained by cutting out the film into a size of 17 cm×16 cm were collectively used as an outer wrapper pair.

(Three-Way Pressure Bonding)

The laminate and the outer wrapper were laminated into a structure, in which both the inner surface sides of the outer wrapper pair faced each other and both the terminals were pulled out from the two corresponding sides of 17 cm each of the outer wrapper pair. Then, the two sides of 17 cm each were subjected to thermocompression bonding to attach resin layers of the laminate together. Next, one side of the remaining two sides having no terminals pulled out was subjected to thermocompression bonding, to thereby form a bag-like thin-type outer wrapper 4c having the separators sandwiched by the electrode pairs inserted thereinto and a side with an unsealed opened portion. The separators were each sandwiched between the electrode pair at a level in which the separators did not fall and the motion of the separators in a maximum expanding direction was not fixed.

(Vacuum Drying)

Before injection of the electrolytic solution, the thin-type outer wrapper 4c (cell) having the electrode pairs and the separators inserted thereinto was dried at 20 torr and 80° C., for 8 hours in a vacuum dryer because water remained in a secondary battery would adversely affect battery characteristics. The outer wrapper was dried in vacuum under heating to simultaneously remove water and prevent oxidation of electrode materials, the copper foil, and the like.

(Injection of Electrolytic Solution)

Figure 6:
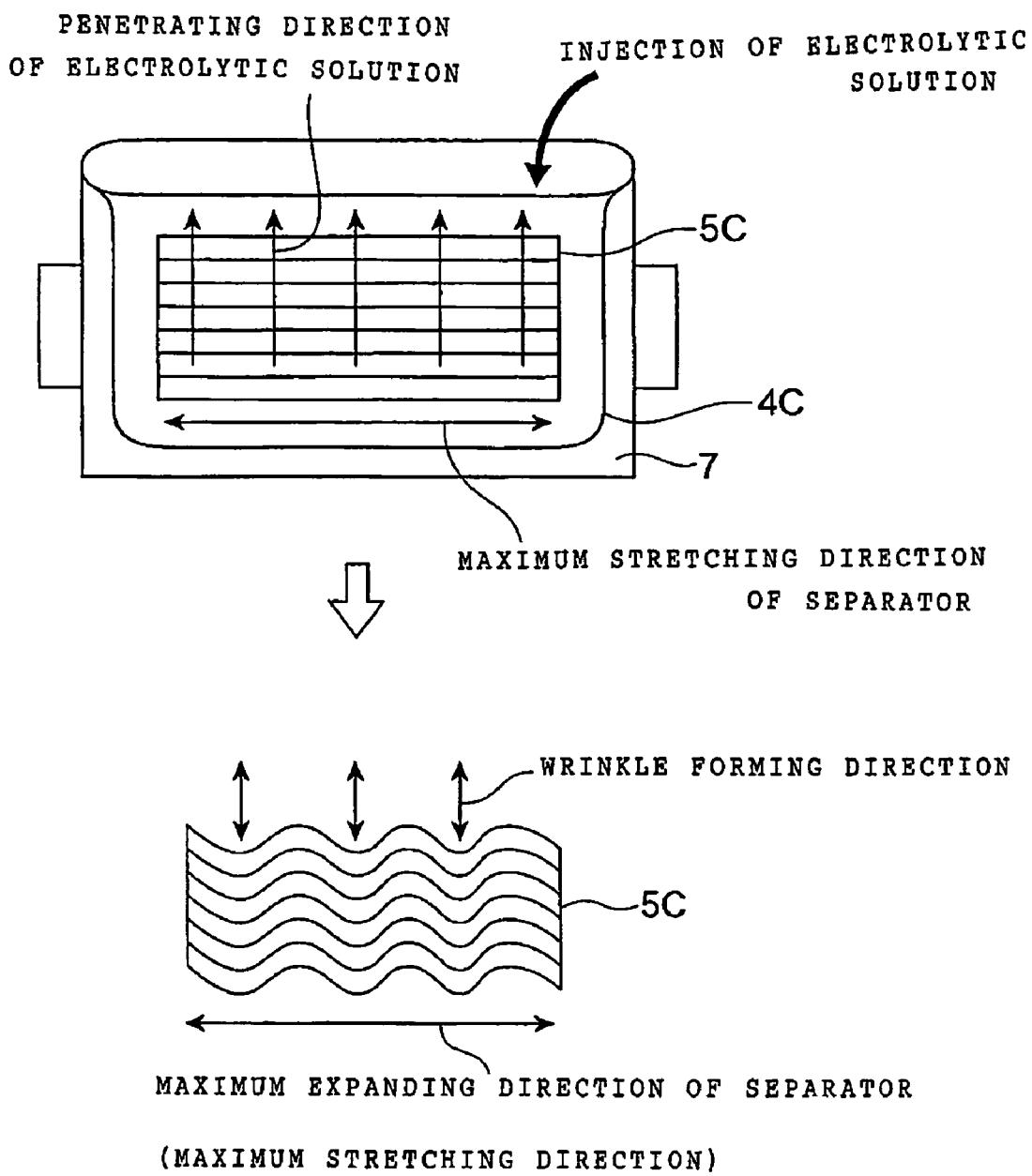
FIG. 6 is a schematic diagram showing a state in which tunnel-like wrinkles are formed on a separator in a direction perpendicular to a maximum stretching direction (maximum expanding direction) of the separator when the maximum stretching direction of the separator and a penetrating direction of an electrolytic solution are substantially perpendicular to each other.
Figure 7:
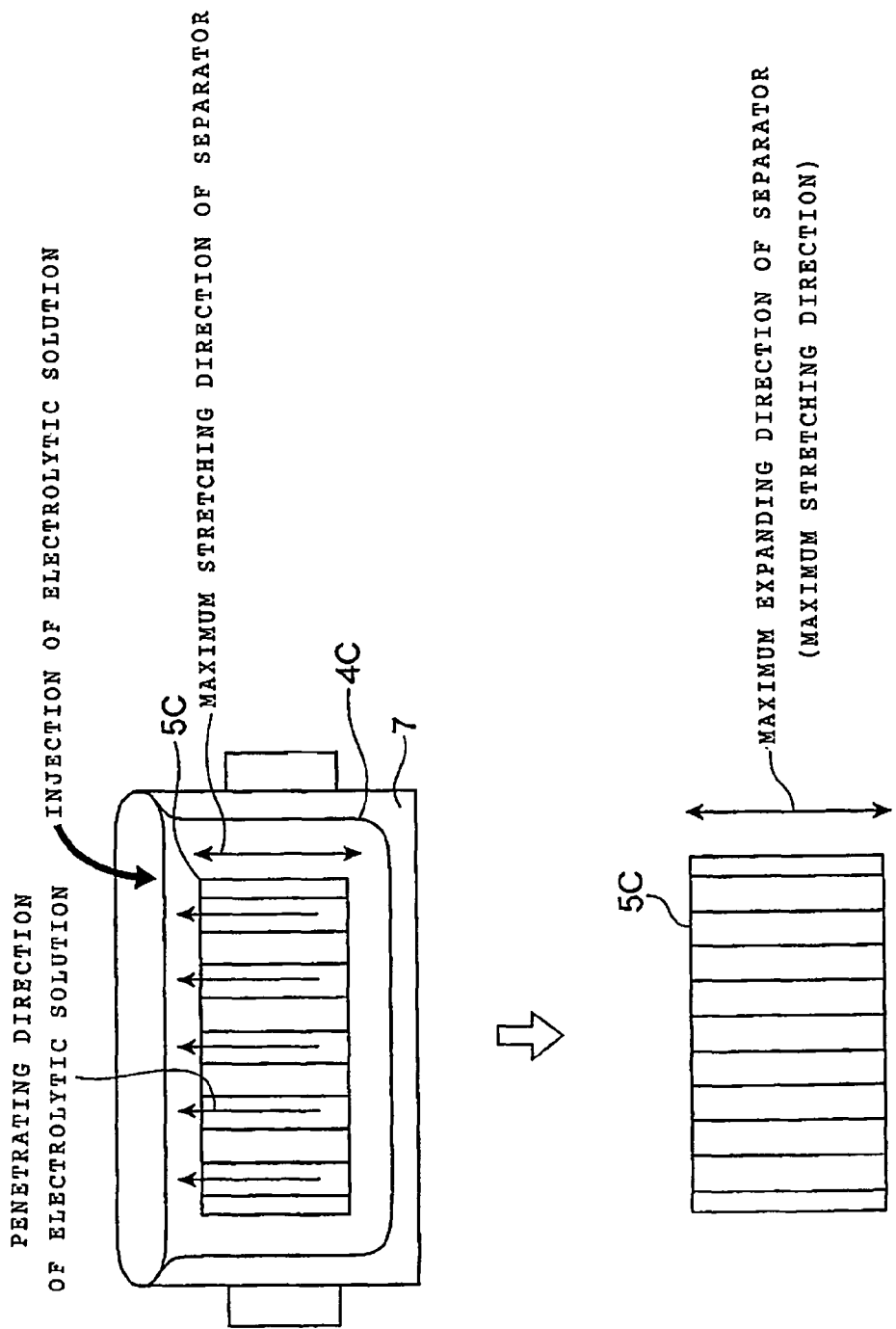
FIG. 7 is a schematic diagram showing a state in which wrinkles are hardly formed on a separator when a maximum stretching direction of the separator and a penetrating direction of an electrolytic solution are substantially parallel to each other.

A predetermined amount of the electrolytic solution was injected into the cell dried in vacuum (FIG. 6). The cell was placed in a substantially vertical direction to the maximum expanding direction (maximum stretching direction) of the separators and was left to stand (subjected to aging) for 30 minutes. The electrolytic solution was accumulated at the bottom once so that the electrolytic solution penetrated upward in the separators from the bottom. That is, the cell was left to stand so that the maximum expanding direction of the separators and the penetrating direction of the electrolytic solution were substantially parallel to each other. Then, defoaming was carried out in a vacuum chamber for removing air bubbles remained in the electrolytic solution. The vacuum defoaming required about 5 minutes, and the defoaming step hardly had an effect on wrinkle formation.

(Sealing)

The side of the opened portion was subjected to thermocompression bonding using a vacuum sealer and was sealed into a tightly sealed state, to thereby produce a sheet-shaped secondary battery 3 of the present invention.

Figure 2:
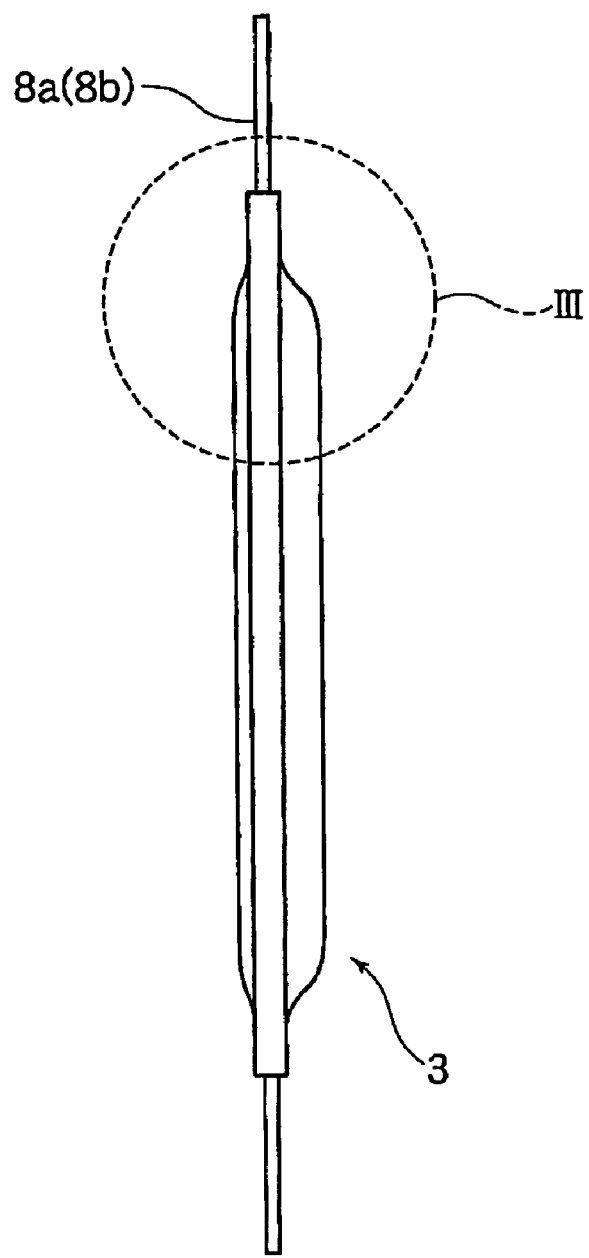
FIG. 2 is a left side view of FIG. 1.
Figure 3:
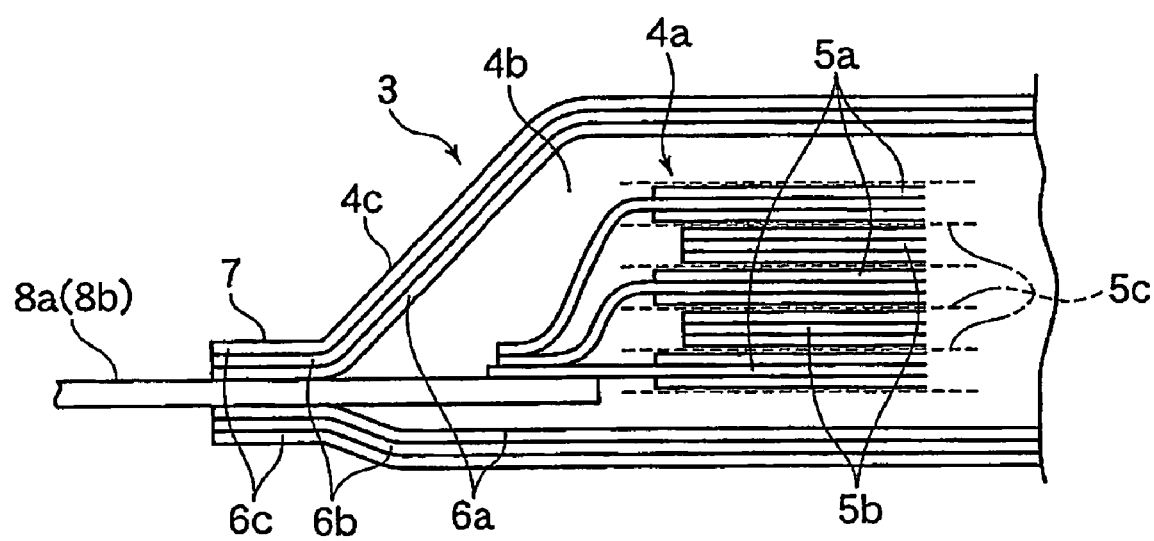
FIG. 3 is a sectional view taken along the line III-III of FIG. 1, for showing an enlarged view of a portion circled by the circle III of FIG. 2.

FIG. 1 shows a perspective view of the sheet-shaped secondary battery, and FIG. 2 shows a left side view thereof. FIG. 3 is a sectional view taken along the line III-III of FIG. 1, showing an enlarged view of a portion circled by the circle III of FIG. 2.

In FIGS. 1 to 3, reference numeral 3 denotes a sheet-shaped lithium ion secondary battery. A flexible bag-like outer wrapper 4c contains an internal electrode pair 4a and an electrolytic solution 4b in a tightly sealed state.

As shown in FIG. 3, the internal electrode pair 4a is formed by alternately laminating: a sheet-shaped positive electrode 5b formed by laminating a positive electrode active material on both surfaces of an aluminum positive electrode current collector; and a sheet-shaped negative electrode 5a formed by laminating a negative electrode active material on both surfaces of a copper negative electrode current collector; through a separator 5c. A negative electrode terminal 8a individually connected to the negative electrode 5a of the internal electrode pair 4a passes through the thermocompression bonded portion 7 of the bag-like outer wrapper 4c air tightly, is fixed to the thermocompression bonded portion 7, and projects outward through the thermocompression bonded portion 7. A pulled out portion is used as an external terminal. A positive electrode terminal 8b is individually connected to the positive electrode 5b, and the positive electrode terminal 8b is pulled out from the bag-like outer wrapper 4c airtightly (though not shown).

Sheet-shaped bus-bars 12a and 12b made of copper are connected with the positive electrode terminal 8b and the negative electrode terminal 8a, respectively. In Embodiment 1, the connection between the negative electrode terminal 8a and the bus-bar 12a and the connection between the positive electrode terminal 8b and the bus-bar 12b are made through ultrasonic welding. Further, the positive electrode terminal 8b is made of aluminum as with the positive electrode current collector, and the negative electrode terminal 8a is made of copper or nickel as with the negative electrode current collector. Materials for the terminals are not particularly limited, but electrochemically stable metal materials are desirably used. Of those, the same material as that used for forming the positive electrode current collector such as aluminum or an aluminum alloy is preferably used as a material for the positive electrode terminal 8b, and at least one of copper and nickel is preferably used as a material for the negative electrode terminal 8a.

Embodiment 1 employs the terminals 8a and 8b each having a thickness of 150 μm, but the terminals may be formed into a strip having a thickness of about 50 μm or more, preferably 100 to 200 μm, for example.

In Embodiment 1, the bag-like outer wrapper 4c is formed of a laminate film of a three layer structure having: an inner surface layer 6a made of polyethylene on an inner surface side; a middle layer 6b made of an aluminum foil in a middle; and an outer surface layer 6c made of nylon on an outer surface side. The separator 5c may be formed of any material such as a porous film of a single layer or multi layers, non-woven fabric, or mesh made of polyethylene, polypropylene, or the like as long as the separator has electrical insulation and sufficient strength to ensure close contact with the negative electrode 5a and the positive electrode 5b. In Embodiment 1, polypropylene is used from the viewpoints of adhesiveness, safety, and the like.

A nonaqueous solvent and an electrolytic salt containing lithium used in conventional cells can be used as a solvent and an electrolytic salt used for the electrolytic solution 4b used as an ion conducting material. Specific examples of the solvent that can be used include: an ester-based solvent such as ethylene carbonate, propylene carbonate, dimethyl carbonate, diethyl carbonate, or methylethyl carbonate; an ether-based single solvent such as dimethoxyethane, diethoxyethane, diethyl ether, or dimethyl ether; and a mixed solvent of two kinds of solvents from the same group or from the different groups. In Embodiment 1, a mixed solvent of ethylene carbonate and diethyl carbonate is used. In addition, specific examples of the electrolytic salt include $LiPF_6$, $LiAsF_6$, $LiClO_4$, $LiBF_4$, $LiCF_3SO_3$, $LiN(CF_3SO_2)_2$, $LiC(CF_3SO_2)_3$, and $LiN(C_2F_5SO_2)_2$. In Embodiment 1, $LiPF_6$ is used.

The method of producing the sheet-shaped secondary battery 3 of Embodiment 1 can provide a thin-type secondary battery 3 suitably formed into a module and having no thickness fluctuation, excellent quality stability, and excellent heat radiation properties. Thus, a high capacity secondary battery can be easily produced, and the secondary battery has advantages of a high degree of freedom in designing the shape thereof and excellent productivity.

The method of producing the sheet-shaped secondary battery 3 of Embodiment 1 can provide a high capacity laminated sheet-shaped secondary battery having excellent heat radiation properties with reduced facility investment cost compared with a secondary battery having the separator 5c fixed under tension in a maximum expanding direction thereof or having the separator 5c fixed by ends such as a wound secondary battery.

Embodiment 2

The separators (4 sheets), the sheet-shaped positive electrodes (2 sheets), and the sheet-shaped negative electrodes (3 sheets) were alternately laminated in the same manner as in the method of producing the sheet-shaped secondary battery 3 of Embodiment 1. A positive electrode terminal of an aluminum foil of width 3 cm×length 4 cm×thickness 0.15 mm was bonded to the positive electrode through ultrasonic welding in a form pulled out from the side of 14.3 cm of the positive electrode so that the center of the positive electrode terminal was provided at a position of 7.15 cm from edges of the side of the positive electrode. A negative electrode terminal of a nickel foil of the same size as that of the positive electrode terminal was bonded to the negative electrode through ultrasonic welding in a form pulled out from the side of 14.8 cm of the negative electrode so that the center of the negative electrode terminal was provided at a position of 7.4 cm from edges of the side of the negative electrode.

(Three-Way Pressure Bonding)

The laminate and the same outer wrapper as that of Embodiment 1 were laminated into a structure in which both the inner surface sides of the outer wrapper pair faced each other, both the terminals were not overlapped on each other, and both the terminals were pulled out from the two corresponding sides of 17 cm each of the outer wrapper pair. Then, the two sides of 17 cm each were subjected to thermocompression bonding to attach resin layers of the laminate together. Next, one side of the remaining two sides having no terminals pulled out was subjected to thermocompression bonding, to thereby form a bag-like thin-type outer wrapper 4c having the separator sandwiched by the electrode pair inserted thereinto and a side with an unsealed opened portion. The separators were each sandwiched between the electrode pair at a level in which the separators did not fall and the motion of the separators in a maximum expanding direction was not fixed.

Figure 4:
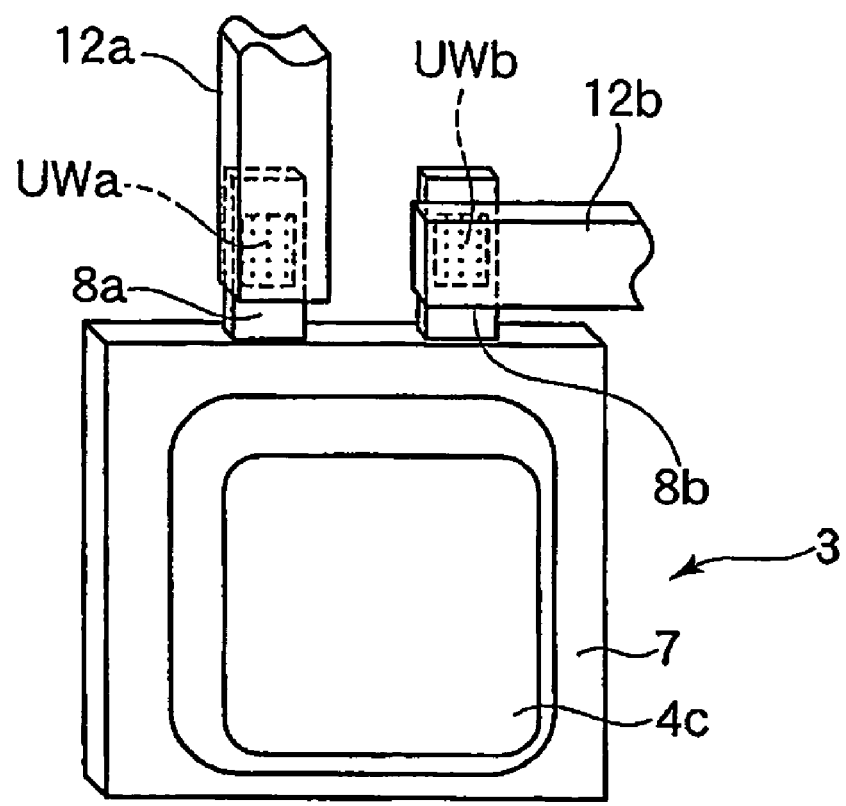
FIG. 4 is a perspective view showing an electrode connection structure of a secondary battery according to Embodiment 2 of the present invention.

The steps of vacuum drying, electrolytic solution injection, and sealing were carried out in the same manner as those in Embodiment 1, and a bus-bar (12a, 12b) was connected to each of the terminals (8b, 8a), to thereby produce a sheet-shaped secondary battery 3 of the present invention shown in a perspective view of FIG. 4.

Embodiment 3

Figure 5:
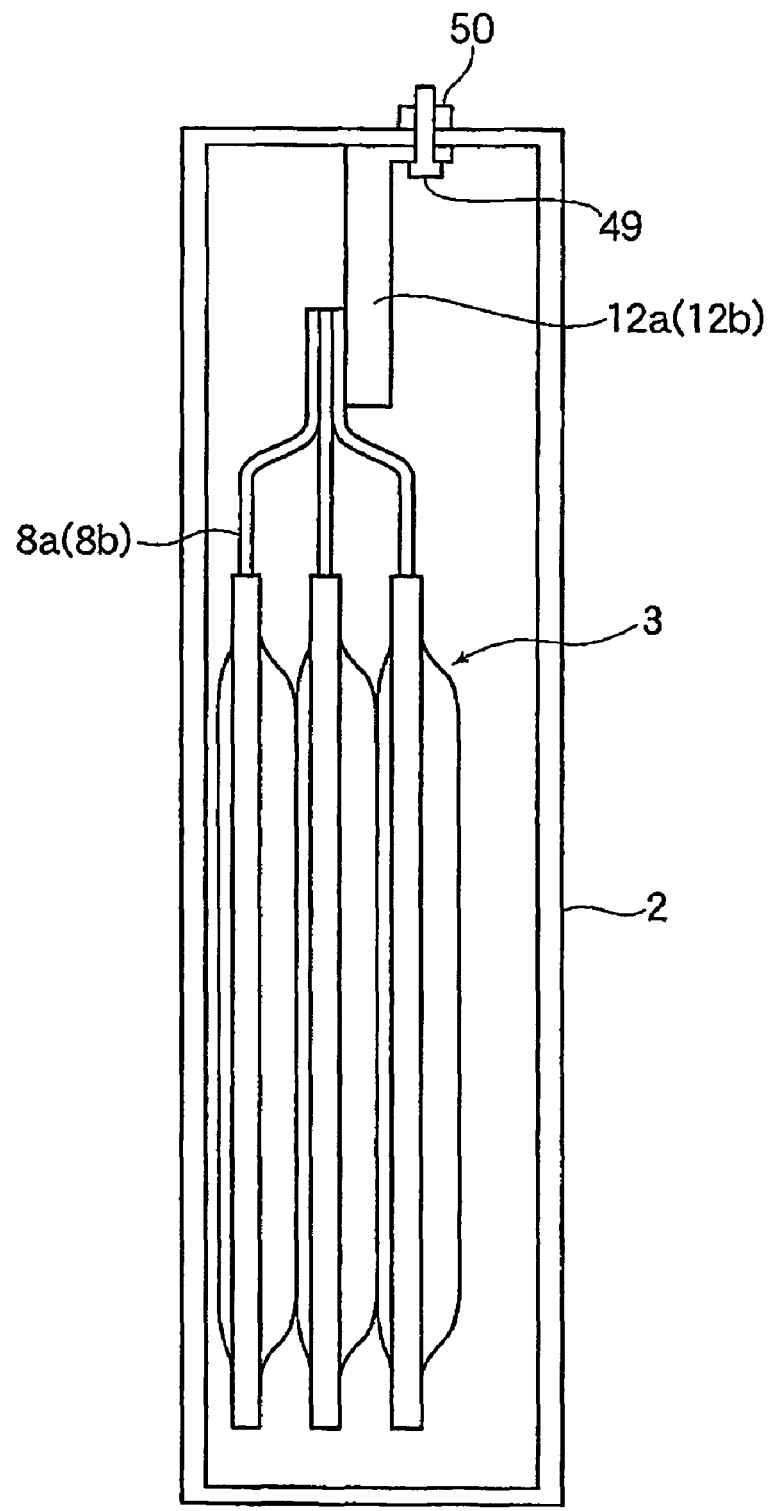
FIG. 5 is a schematic sectional view of a secondary battery module in which a battery pack consisting of three secondary batteries of Embodiment 2 are contained in a casing.

Three secondary batteries 3 of Embodiment 2 were connected in parallel to form a battery pack and the battery pack was contained in a casing 2, to thereby produce a secondary battery module. FIG. 5 shows a sectional view of the secondary battery module.

In the secondary battery module of Embodiment 3, each lithium ion secondary battery (unit battery) forming the battery pack is formed to have a substantially block-shaped contour by alternately laminating a positive electrode having a positive electrode active material applied onto a metal material and a negative electrode having a negative electrode active material applied onto a metal material through a separator. The battery pack is formed by connecting two or more of the unit batteries in parallel. Unit batteries of the battery pack contained in a container main body (casing) are divided by partition walls provided in the container main body to insulate each unit battery, and are suitable for forming a high capacity secondary battery module.

According to the secondary battery module of Embodiment 3, the terminal 8a (8b) can efficiently transfer heat of each electrode 4a (4b) to the bus-bar 12a (12b), and the terminal 8a (8b) itself may have a heat radiation effect.

The secondary battery module of Embodiment 3 has a mode prepared by laminating three sheet-shaped secondary batteries 3 and connecting them in parallel with each other, for example. However, the number of the sheet-shaped secondary batteries 3 to be laminated is not limited to three, and may be two, or four or more. Further, the connection is not limited to parallel connection, and may be series connection involving connecting the positive electrode and the negative electrode of each sheet-shaped secondary battery 3 in series, or a combination of series connection and parallel connection.

The secondary battery module of Embodiment 3 has a simple structure and miniaturization or weight saving thereof is possible. Further, the module can be formed to be thin as required to allow efficient dissipation of heat generated inside the cell to the outside. The secondary battery module of Embodiment 3 is expected to be suitably applied to: a relatively small capacity secondary battery used in fields of electrical or electronic devices, communication devices, optical devices, audio equipment, and the like; and a relatively large capacity secondary battery used in fields of electric automobiles and the like, utilizing characteristics of being small-size, lightweight, thin, and having a high degree of freedom in shape.

As described above, the present invention can provide a high capacity thin-type secondary battery suitably formed into a module and having no thickness fluctuation, excellent quality stability, and excellent heat radiation properties. The present invention can provide a high capacity thin-type with reduced facility investment cost compared with a secondary battery having the separator fixed under tension in a maximum expanding direction thereof or having the separator fixed by ends such as a wound secondary battery.

What is claimed is:

1. A method of producing a sheet-shaped secondary battery, comprising the steps of:
    sandwiching a sheet-shaped separator formed of a porous stretched sheet by a sheet-shaped electrode pair, the separator having a maximum expanding direction directed in a maximum stretching direction of the porous stretched sheet due to penetration of an electrolytic solution;
    inserting the separator sandwiched by the electrode pair into a sheet-shaped outer wrapper having an opened portion;
    injecting the electrolytic solution into the sheet-shaped outer wrapper;
    holding the sheet-shaped outer wrapper in a state where the maximum expanding direction of the separator is substantially vertical along the direction of gravity so that the electrolytic solution upwardly penetrates from a lower part of the separator into the separator without fixing motion of the separator in the maximum expanding direction and with the maximum expanding direction of the separator and a penetrating direction of the electrolytic solution being substantially parallel to each other; and
    sealing the opened portion into a tightly sealed state.

2. The method of producing a sheet-shaped secondary battery according to claim 1, wherein
    i) the separator sandwiched by the electrode pair is inserted into the sheet-shaped outer wrapper, and then
    ii) the electrolytic solution is injected into the sheet-shaped outer wrapper.

3. The method of producing a sheet-shaped secondary battery according to claim 1, wherein
    i) the electrolytic solution is injected into the sheet-shaped outer wrapper, and then
    ii) the separator sandwiched by the electrode pair is inserted into the sheet-shaped outer wrapper having the electrolytic solution therein.

4. The method of producing a sheet-shaped secondary battery according to claim 1, wherein an angle between the maximum expanding direction of the separator and the penetrating direction of the electrolytic solution is 0 to 30° during penetration of the electrolytic solution.

5. The method of producing a sheet-shaped secondary battery according to claim 1, wherein: the separator has electrolytic solution penetration rate anisotropy; and the electrolytic solution is penetrated into the separator in a state where a direction of a maximum electrolytic solution penetration rate of the separator and the penetrating direction of the electrolytic solution are substantially perpendicular to each other.

6. The method of producing a sheet-shaped secondary battery according to claim 5, wherein an angle between the direction of the maximum electrolytic solution penetration rate of the separator and the penetrating direction of the electrolytic solution is 60 to 90° during penetration of the electrolytic solution.

7. The method of producing a sheet-shaped secondary battery according to claim 1, wherein a plurality of the separators each sandwiched by the electrode pair are laminated and inserted into the sheet-shaped outer wrapper.

8. The method of producing a sheet-shaped secondary battery according to claim 1, wherein the sheet-shaped outer wrapper comprises a flexible sheet-shaped outer wrapper.

9. The method of producing a sheet-shaped secondary battery according to claim 8, wherein the flexible sheet-shaped outer wrapper has a substantially rectangular shape.

10. The method of producing a sheet-shaped secondary battery according to claim 9, wherein: the flexible sheet-shaped outer wrapper has a bag-like shape with one unsealed side; the electrolytic solution is injected to penetrate into the separator; and the unsealed side is sealed into a tightly sealed state.

11. The method of producing a sheet-shaped secondary battery according to claim 9, wherein: the separator sandwiched by the electrode pair is sandwiched by a substantially rectangular sheet-shaped outer wrapper pair formed of a laminate film; an edge portion of the sheet-shaped outer wrapper pair is sealed with one side remained unsealed; the electrolytic solution is injected to penetrate into the separator; and the unsealed side is sealed into a tightly sealed state.

12. The method of producing a sheet-shaped secondary battery according to claim 11, wherein: the electrode pair is connected to a positive electrode terminal and a negative electrode terminal; and the separator sandwiched by the electrode pair is sandwiched by the sheet-shaped outer wrapper pair with both the terminals pulled out.

13. The method of producing a sheet-shaped secondary battery according to claim 12, wherein both the terminals are sandwiched by the sheet-shaped outer wrapper pair with both the terminals pulled out from one side of the sheet-shaped outer wrapper pair.

14. The method of producing a sheet-shaped secondary battery according to claim 13, wherein the one side of the sheet-shaped outer wrapper pair and the maximum expanding direction of the separator are substantially parallel to each other.

15. The method of producing a sheet-shaped secondary battery according to claim 13, wherein the one side of the sheet-shaped outer wrapper pair and the maximum expanding direction of the separator are substantially perpendicular to each other.

16. The method of producing a sheet-shaped secondary battery according to claim 12, wherein both the terminals are sandwiched by the sheet-shaped outer wrapper pair with both the terminals pulled out from two corresponding sides of the sheet-shaped outer wrapper pair.

17. The method of producing a sheet-shaped secondary battery according to claim 16, wherein the two sides of the sheet-shaped outer wrapper pair and the maximum expanding direction of the separator are substantially parallel to each other.

* * * * *